(12) United States Patent
Medler et al.

(10) Patent No.: US 8,026,902 B2
(45) Date of Patent: Sep. 27, 2011

(54) INPUT DEVICE FOR A MOTOR VEHICLE

(75) Inventors: Andreas Medler, Lengede (DE); Ulrike Wehling, Braunschweig (DE); Alf Pollex, Wolfenbüttel (DE); Jan Michaelis, Berlin (DE); Rainer Dehmann, Berlin (DE); Kyoung Sun Han, Berlin (DE)

(73) Assignee: Volkswagen AG, Wolfsburg (DE)

( * ) Notice: Subject to any disclaimer, the term of this patent is extended or adjusted under 35 U.S.C. 154(b) by 765 days.

(21) Appl. No.: 11/544,345

(22) Filed: Oct. 5, 2006

(65) Prior Publication Data

US 2007/0146341 A1 Jun. 28, 2007

(30) Foreign Application Priority Data

Oct. 5, 2005 (DE) .......................... 10 2005 047 650

(51) Int. Cl.
*G06F 3/041* (2006.01)
(52) U.S. Cl. ......................................................... 345/173
(58) Field of Classification Search .................. 345/156, 345/168, 169, 173–178; 178/18.01, 18.01–18.09, 178/18.11
See application file for complete search history.

(56) References Cited

U.S. PATENT DOCUMENTS

| 4,044,186 | A | 8/1977 | Strangeland |
| 4,885,565 | A | 12/1989 | Embach |
| 5,988,902 | A | 11/1999 | Holehan |
| 6,118,435 | A | 9/2000 | Fujita et al. |
| 6,429,846 | B2 | 8/2002 | Rosenberg et al. |
| 6,687,614 | B2 * | 2/2004 | Ihara et al. ..................... 701/209 |
| 7,176,885 | B2 * | 2/2007 | Troxell et al. .................. 345/156 |
| 7,489,303 | B1 * | 2/2009 | Pryor ............................. 345/173 |
| 2004/0122572 | A1 * | 6/2004 | Ichinose ......................... 701/36 |
| 2005/0057528 | A1 * | 3/2005 | Kleen ............................ 345/173 |
| 2005/0122317 | A1 * | 6/2005 | Schaaf et al. .................. 345/173 |
| 2005/0225539 | A1 * | 10/2005 | Prados .......................... 345/173 |

FOREIGN PATENT DOCUMENTS

| DE | 2 349 499 | 4/1974 |
| DE | 197 31 285 | 1/1999 |
| DE | 201 02 197 | 7/2001 |
| DE | 200 22 244 | 12/2001 |
| DE | 201 80 024 | 1/2002 |
| DE | 103 40 188 | 4/2005 |
| EP | 920 704 | 6/1999 |
| EP | 0 927 925 | 7/1999 |
| EP | 1 560 102 | 8/2005 |
| GB | 1 416 507 | 12/1975 |
| JP | 09167541 A * | 6/1997 |
| WO | WO 97/21160 | 6/1997 |
| WO | WO 98/08241 | 2/1998 |
| WO | WO 99/26230 | 5/1999 |
| WO | WO 01/54109 | 7/2001 |
| WO | WO 03/038800 | 5/2003 |
| WO | WO 03/041046 | 5/2003 |
| WO | WO 2006097400 A1 * | 9/2006 |

* cited by examiner

*Primary Examiner* — Stephen Sherman
(74) *Attorney, Agent, or Firm* — Kenyon & Kenyon LLP (57) ABSTRACT

An input device, e.g., for a motor vehicle, includes: a display for the visual representation of an operating element; a touch screen disposed above the display for detecting a touching contact of the touch screen in the region of the operating element; and a control system for displacing the operating element, represented with the aid of the display, according to a touching motion across the touch screen, and the input device including an actuator for deflecting the touch screen when the operating element attains a predefined position or is moved a predefined distance.

19 Claims, 9 Drawing Sheets

INPUT DEVICE FOR A MOTOR VEHICLE

CROSS-REFERENCE TO RELATED APPLICATIONS

This application claims priority to Application No. 10 2005 047 650.3, filed in the Federal Republic of Germany on Oct. 5, 2005, which is expressly incorporated herein in its entirety by reference thereto.

FIELD OF THE INVENTION

The present invention relates to an input device, e.g., for a motor vehicle, having a touch screen.

BACKGROUND INFORMATION

German Published Patent Application No. 201 02 197, for example, describes a touch screen for visually representing electronic signals and for touch input of signs and symbols for confirmation purposes, the touch screen including a functional plane for visual representation and keystroke input, and a higher-level protective plane corresponding thereto that is deformable at certain points. In this context, when certain points of the functional plane are selected by touching contact across the protective plane, at least one confirmation signal is generated at the position of the point of contact in the deformed protective plane so as to be perceptible for the user's sense of touch (haptic stimulus), and the confirmation signal for the sense of touch (haptic stimulus) is generated by vibration elements eccentrically positioned within and/or underneath the functional plane. In addition, in the touch screen, the generated vibrations are transmitted from the functional plane to the protective plane as the result of direct contacting of the two planes and/or via the edge regions of the planes by way of rigid or elastic connecting elements.

Touch screen are also described, for example, in U.S. Pat. No. 4,885,565 and European Published Patent Application No. 0 920 704. Suitable touch screens may be purchased from 3M™ (cf. www.3m.com), for example. Additional details of touch screens are described in European Published Patent Application No. 1 560 102, for example.

In German Published Patent Application No. 201 80 024 and PCT International Published Patent Application No. WO 01/54109, a touch-sensitive control featuring haptic feedback for inputting signals into a computer and for outputting forces to a user of the touch-sensitive control is described for haptic feedback, the touch-sensitive control having a touch-sensitive input device which has a virtually planar touch-screen surface that is operated such that, on the basis of a position on the touch-screen surface touched by a user, a positional signal is input into a processor of the computer, the positional signal reproducing the position in two dimensions. The touch-sensitive control described in PCT International Published Patent Application No. WO 01/54109 also has at least one actuator connected to the touch-screen input device, the actuator outputting a force to the touch-screen input device to provide the user touching the touch-screen surface with a haptic sensation, the actuator outputting the force directly to the touch-screen input device on the basis of force information output by the processor.

Haptic feedback is also described in U.S. Pat. No. 6,429, 846, PCT International Published Patent Application No. WO 03/038800, U.S. Pat. No. 5,988,902, PCT International Published Patent Application No. WO 99/26230, PCT International Published Patent Application No. WO 97/21160, German Published Patent Application No. 200 22 244, and PCT International Published Patent Application No. WO 03/41046.

U.S. Pat. No. 6,118,435 describes a touch panel.

German Published Patent Application No. 197 31 285 describes an operating element for a device having a plurality of selectable menus, functions, and/or functional values, which has a surface that is visible to the user and via which the selection may be made by a local movement or touching contact of the operating surface. The form of the surface can be altered to conform to the selected and/or selectable menu, function and/or functional value.

SUMMARY

Example embodiments of the present invention may provide an input device having a touch screen that may be particularly suited for motor vehicles.

According to an example embodiment of the present invention, an input device, e.g., for a motor vehicle, includes: a display for the visual display of an operating element; a touch screen disposed above the display to detect touching (e.g., of an operating surface) of the touch screen in the region of the operating element; and a control device to displace the operating element represented with the aid of the display according to a touching motion across the touch screen (detected via the touch screen, e.g.); and the input device having an actuator to deflect the touch screen when the operating element attains a predefined position and/or is moved a predefined distance.

It may be provided that the actuator is controllable via the control system to deflect the touch screen. The deflection may end after a specific period of time, e.g., after 20 µs to 150 µs.

Given a deflection of the touch screen, when the operating element is moved a predefined distance, it may be provided that the touch screen is deflected again or is deflectable when the operating element is moved by the substantially integral multiple of the predefined distance. For example, if a deflection after 3 mm is provided (as defined distance), then a deflection occurs also after 6 mm, after 9 mm, after 12 mm, after 15 mm, etc.

Touching of the touch screen may also, or only, be pressing on the touch screen.

The operating element may be moved according to a touching motion only if this touching motion has its origin in the region of the operating element. The operating element may be moved according to a touching motion only if this touching motion passes through the region of the operating element. For example, it may be provided that the operating element is moved according to the touching motion only after having passed through the region of the operating element.

The touch screen may be deflectable both when the operating element attains a predefined position, and when the operating element is moved a predefined distance.

The amplitude of the deflection of the touch screen may be adjustable as a function of the position of the operating element, or a distance across which the operating element is moved.

The touch screen may be deflectable at a specific frequency, the frequency being adjustable as a function of the position of the operating element or a distance across which the operating element is moved.

The predefined distance may be between 1 mm and 5 mm.

The operating element may include a slider and/or a map.

According to an example embodiment of the present invention, an input device, e.g., for a motor vehicle, includes: a display for the visual representation of an operating element; a touch screen disposed above the display to detect touching (e.g., of an operating surface) of the touch screen in the region of the operating element; a control system to slide the operating element displayed with the aid of the display across the touch screen according to a touching motion (detected via the touch screen, e.g.); and an actuator for the periodic deflection of the touch screen at a specific frequency, the frequency and/or the amplitude of the deflection being adjustable as a function of the position of the operating element or a distance across which the operating element is moved.

The operating element may be moved according to a touching motion only if the touching motion has its origin in the region of the operating element. The operating element may be moved according to a touching motion only if the touching motion extends through the region of the operating element. For example, it may be provided that the operating element is moved according to the touching motion only after having passed through the region of the operating element.

The frequency may be between 1 Hz and 30 Hz.

The operating element may be a slider and/or a map.

According to an example embodiment of the present invention, a method is for operating an input device, e.g., an input device having one or a plurality of the aforementioned features, the input device having a display for the visual representation of an operating element; as well as a touch screen, disposed above the display, to detect touching (of an operating surface, e.g.) of the touch screen in the region of the operating element, the operating element displayed with the aid of the display being according to a touching motion moved across the touch screen (detected via the touch screen, e.g.), and the touch screen being deflected when the operating element attains a predefined position and/or is moved a predefined distance.

The deflection may end after a specific period of time, e.g., after 20 ms to 150 ms.

The operating element may be moved according to a touching motion only if the touching motion has its origin in the region of the operating element. The operating element may be moved according to a touching motion only if this touching motion extends through the region of the operating element. For example, it may be provided that the operating element is moved according to the touching motion only after passing through the region of the operating element.

The touch screen may be deflected both when the operating element attains a predefined position and also when it is moved a predefined distance.

The touch screen may be deflected with an oscillatory motion.

According to an example embodiment of the present invention, a method is for operating an input device, e.g., an input device having one or a plurality of the previous features, the input device having a display for the visual representation of an operating element, and a touch screen disposed above the display to detect touching (of an operating surface, e.g.) of the touch screen in the region of the operating element, the operating element displayed with the aid of the display being moved across the touch screen according to a touching motion (detected by the touch screen, e.g.), the touch screen being deflected at a certain frequency when the operating element is moved, and the frequency and/or the amplitude of the deflection being adjusted as a function of the position of the operating element or a distance across which the operating element is moved.

The operating element may be moved according to a touching motion only if the touching motion has its origin in the region of the operating element. The operating element may be moved according to a touching motion only if the touching motion extends through the region of the operating element. For example, it may be provided that the operating element is moved according to the touching motion only after passing through the region of the operating element.

The frequency may be between 1 Hz and 30 Hz.

A touch screen may include a transparent touch screen, for example. A display may include, e.g., a display or matrix display for the variable representation of information. A display may include a TFT, for example.

A motor vehicle may include, e.g., a land vehicle that may be used individually in road traffic. However, motor vehicles are not restricted to land vehicles having an internal combustion engine.

Further aspects and features of example embodiments of the present invention are described in more detail below with reference to the appended Figures.

DETAILED DESCRIPTION

Figure 1:
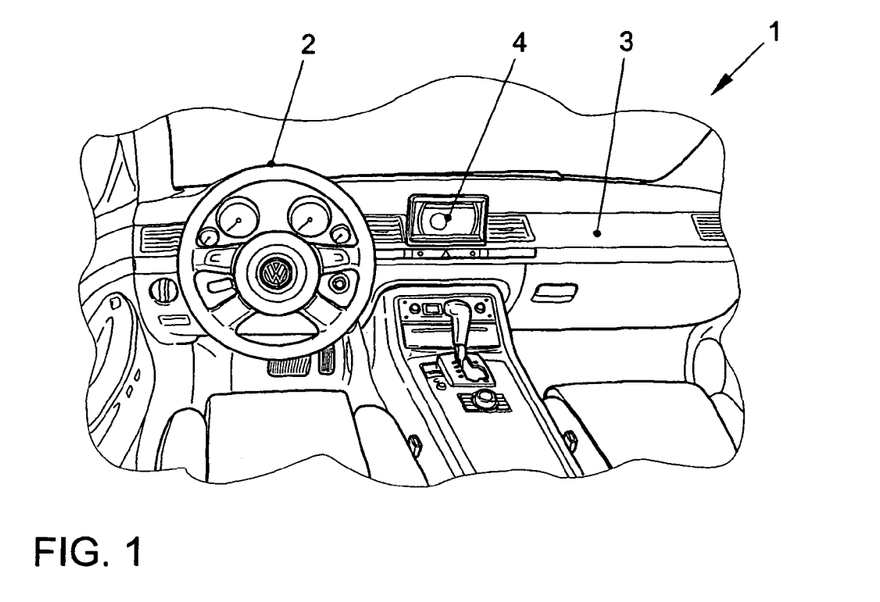
FIG. 1 illustrates an exemplary embodiment of a cockpit or passenger compartment of a motor vehicle.

FIG. 1 illustrates an exemplary embodiment of a passenger compartment of a motor vehicle 1. A steering wheel 2 is arranged in passenger compartment 1 underneath an instrument panel 3. Instrument panel 3 has an input device 4 arranged next to steering wheel 2. As an alternative or in addition, an input device corresponding to input device 4 may also be disposed in steering wheel 2.

Figure 2:
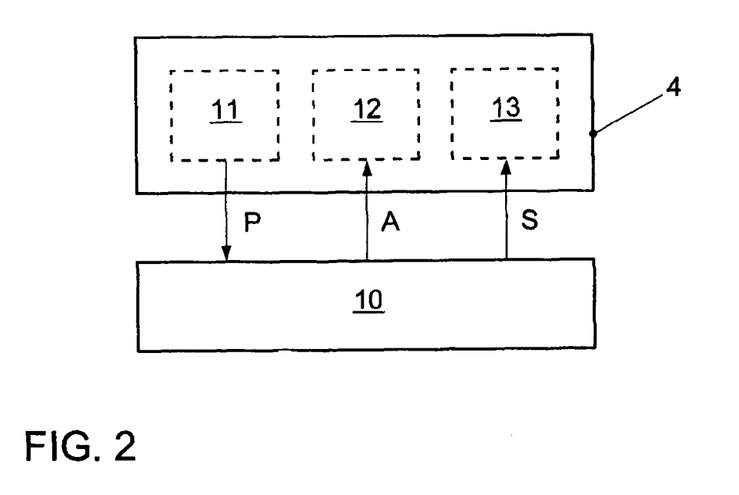
FIG. 2 schematically illustrates an exemplary embodiment of an input device having an assigned control system.
Figure 3:
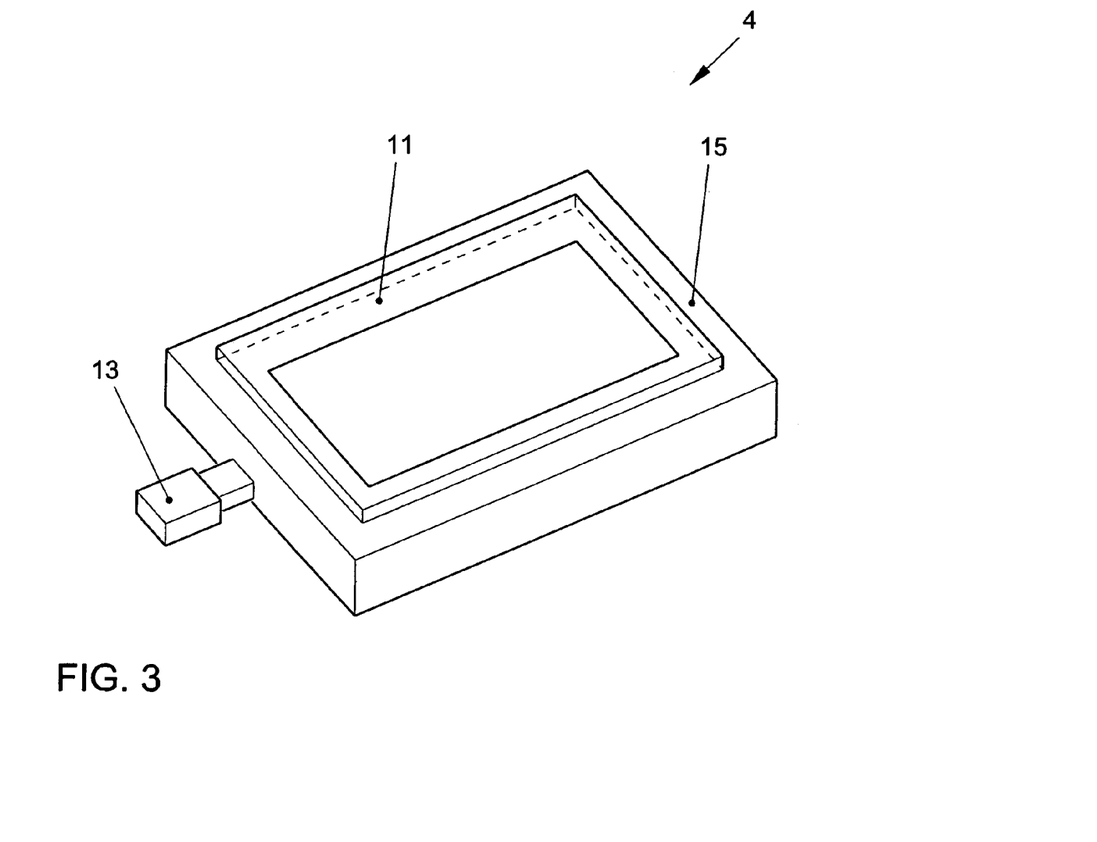
FIG. 3 is a perspective view of the input device illustrated in FIG. 2.
Figure 4:
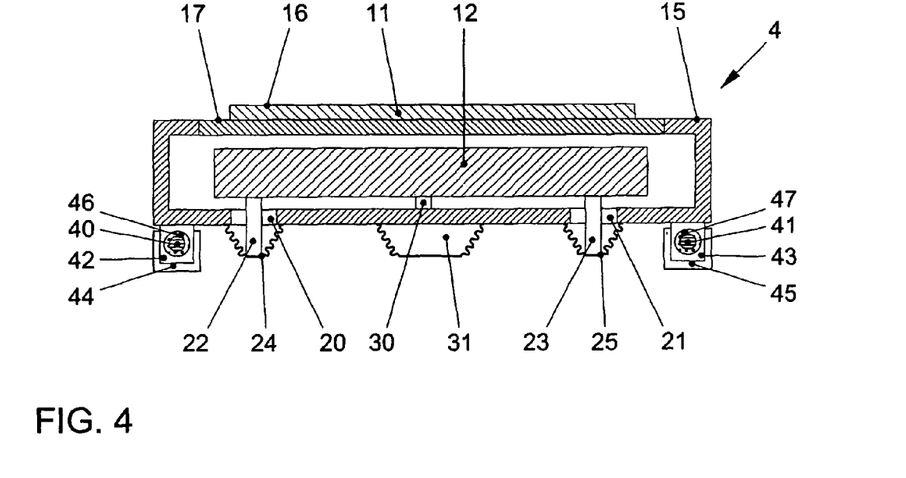
FIG. 4 is a cross-sectional view of the input device illustrated in FIG. 2.
Figure 5:
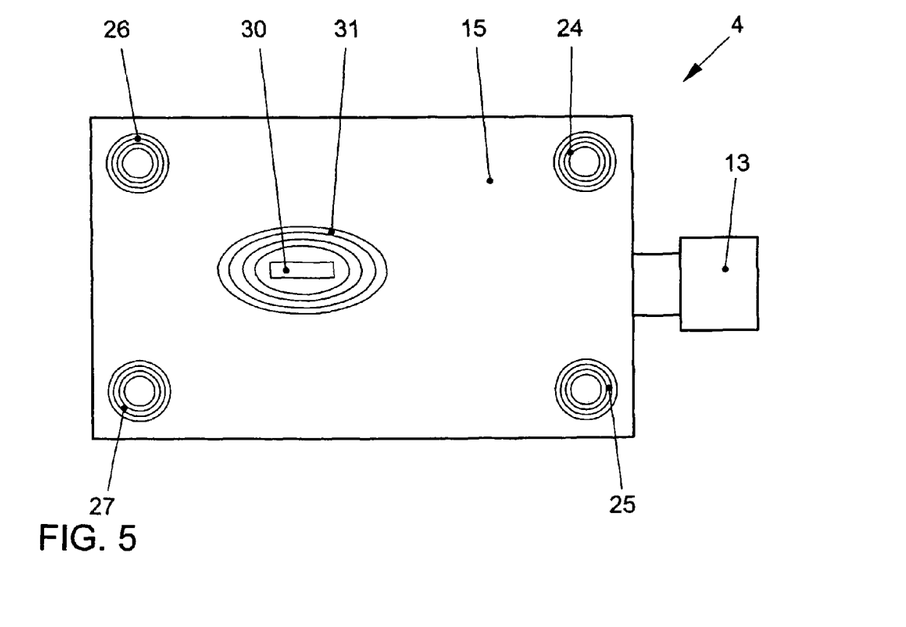
FIG. 5 is a view of the an input device illustrated in FIG. 2, from below.

FIG. 2 illustrates input device 4 with an assigned control system in a basic representation. FIG. 3 illustrates input device 4 in a perspective plan view. FIG. 4 illustrates input device 4 in cross-section. FIG. 5 illustrates input device 4 from below. Input device 4 includes a housing 15; a display 12, arranged in housing 15, for the visual representation of information and operating elements; a touch screen 11 disposed above display 12 and connected to the housing to detect touching of the touch screen or to input instructions by touching an operating surface 16 of touch screen 11; and an actuator 13 to move housing 15, and thus touch screen 11, with respect to display 12. Input device 4 is assigned a control system 10 by which various information is able to be displayed on display 12 by outputting a corresponding display signal A. In addition, control system 10 reads in a position signal P that is output by touch screen 11 and indicates the position of a touching contact of operating surface 16, or pressing on operating surface 16. Furthermore, control system 10 controls the movement of actuator 13 by outputting an actuator control signal S. Actuator 13 may be arranged as described, for example, in European Published Patent Application No. 1 560 102, which is expressly incorporated herein in its entirety by reference thereto. Moreover, piezoactuator or so-called voice coils, for example, are able to be used as actuator 13.

Touch screen 11 is affixed on the outside of housing 15. Housing 15 is transparent, at least in the region below touch screen 11 denoted by reference numeral 17. As an alternative, touch screen 11 may also be arranged as part of housing 15.

As illustrated in FIG. 4 and FIG. 5, housing 15 includes four openings 20 and 21, each covered by a flexible collar 24, 25, 26 and 27, respectively, through which affixation elements 22 and 23 are guided to mount display 12 on steering wheel 2 or instrument panel 3. Moreover, housing 15 includes an additional opening covered by another flexible collar 31, through which a plug contact 30 for the energy supply of display 12 and for transmission of display signal A is guided to display 12. Flexible collars 24, 25, 26, 27 and 31 may be made of an elastomer, for example, or include an elastomer. For example, it may be provided that the flexibility of collars 24, 25, 26, 27 and 31 is adapted to the mass of housing 15 including touch screen 11 such that housing 15 (including touch screen 11) in connection with collars 24, 25, 26, 27 and 31 has a mechanical natural frequency, e.g., of between 5 Hz and 150 Hz. The natural frequency is adapted to actuator 13, for example, or actuator 13 is selected according to the natural frequency.

Input device 4 includes connection elements for the form-fitting connection of housing 15 to display 12, so that housing 15 is displaceable with respect to display 12 only along a straight line. To this end, a connection element includes at least one affixation element 44 or 45, which is connected, or may be connected, to steering wheel 2 or instrument panel 3, to fix in place a rod 40 and 41, respectively. In addition, a connection element includes at least one sliding element 42 and 43 in each case, which is connected to housing 15, each sliding element having at least one sliding bearing 46 and 47 by which sliding element 42 and 43 is movable along rod 40 and 41, respectively. It may also be provided that sliding element 42 or 43 is connected, or is connectable, to steering wheel 2 or instrument panel 3, and affixation element 44 or 45 is (immovably) joined to housing 15. The movable connection between display 12 and housing 15 may be implemented via steering wheel 2 or instrument panel 3 or via an additional element. It is possible, for example, that both the sliding elements 42 and 43 as well as affixation elements 44 and 45 are affixed on a frame. This frame may be connected to steering wheel 2 or instrument panel 3 for installation in motor vehicle 1.

Alternatively, input device 4 includes an already mentioned display, a touch screen disposed above the display, and a flexible element disposed between the display and the touch screen to prevent the entry of particles between the display and the touch screen. In addition, the input device includes a previously mentioned actuator to move the touch screen with respect to the display in at least one direction, e.g., in a direction that is parallel to the operating surface of the touch screen. The flexible element may be arranged at the edge of the touch screen, such that it substantially does not obstruct a display surface of the display. The flexible element may have a rigidity that is adapted to a mass of the touch screen such that the touch screen in connection with the flexible element has a mechanical natural frequency, e.g., of between 5 Hz and 150 Hz in the movement direction. The flexible element may be made of foamed material such as polyurethane, an elastomer, etc. The flexible element may be designed arranged as described, for example, in U.S. Pat. No. 4,044,186 or German Published Patent Application No. 2 349 499, each of which is expressly incorporated herein in its entirety by reference thereto.

Control system 10 is arranged such that an operating element represented with the aid of display 12 is moved across touch screen 11 according to a touching movement (detected with the aid of the touch screen, for example), the touch screen being deflected when the operating element attains a predefined position and/or is moved a predefined distance. As an alternative or in addition, control system 10 is arranged such that an operating element represented with the aid of display 12 is moved across touch screen 11 according to a touching motion (detected with the aid of the touch screen, for example), touch screen 11 being deflected at a specific frequency when the operating element is moved, and the frequency and/or the amplitude of the deflection being adjusted as a function of the position of the operating element or a distance across which the operating element is moved.

Figure 6:
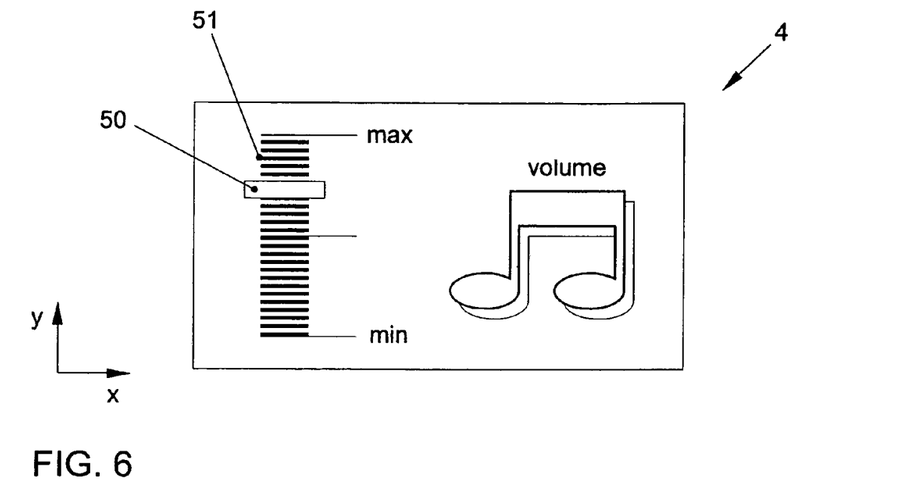
FIG. 6 illustrates the input device illustrated in FIG. 2 while displaying an operating mask for adjusting a volume.
Figure 7:
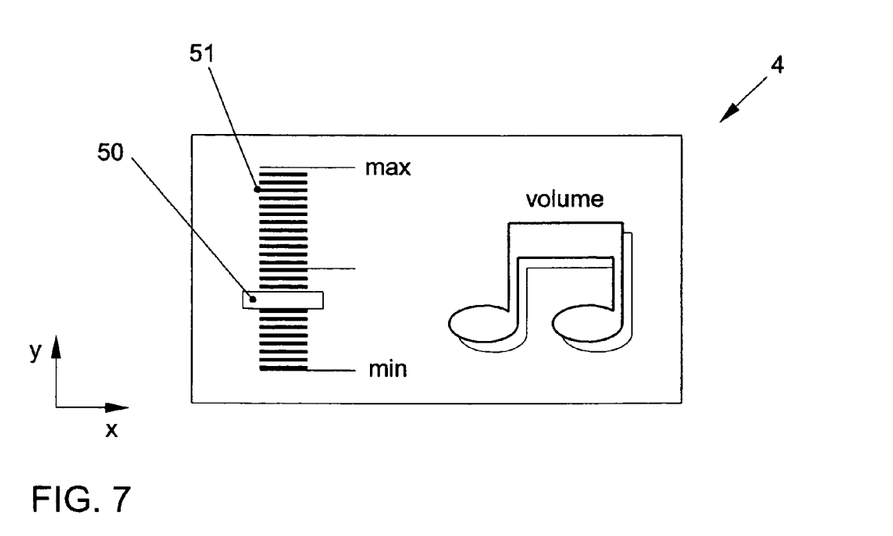
FIG. 7 illustrates the input device illustrated in FIG. 2 while displaying an operating mask for adjusting a volume.

FIG. 6 and FIG. 7 illustrate input device 4 while an operating mask for adjusting a volume is displayed. Reference numeral 50 denotes a slider displayed by display 12, which, in order to adjust the volume, may be moved along a scale 51 according to a touching motion across touch screen 11 detected with the aid of touch screen 11. Slider 50 may be moved across touch screen 11 according to a touching motion detected with the aid of touch screen 11, regardless of whether this motion also occurs in the region of slider 50. Slider 50 may be moved according to the touching motion only if this motion originates in the region of slider 50. Slider 50 may be moved according to the touching motion only when this touching motion extends through the region of slider 50. It may be provided that slider 50 is moved according to the touching motion only after passing through the region of slider 50. X and y denote a coordinate system, position signal P indicating the position of a touching contact of operating surface 16 of touch screen 11 with the aid of these coordinates.

Figure 8:
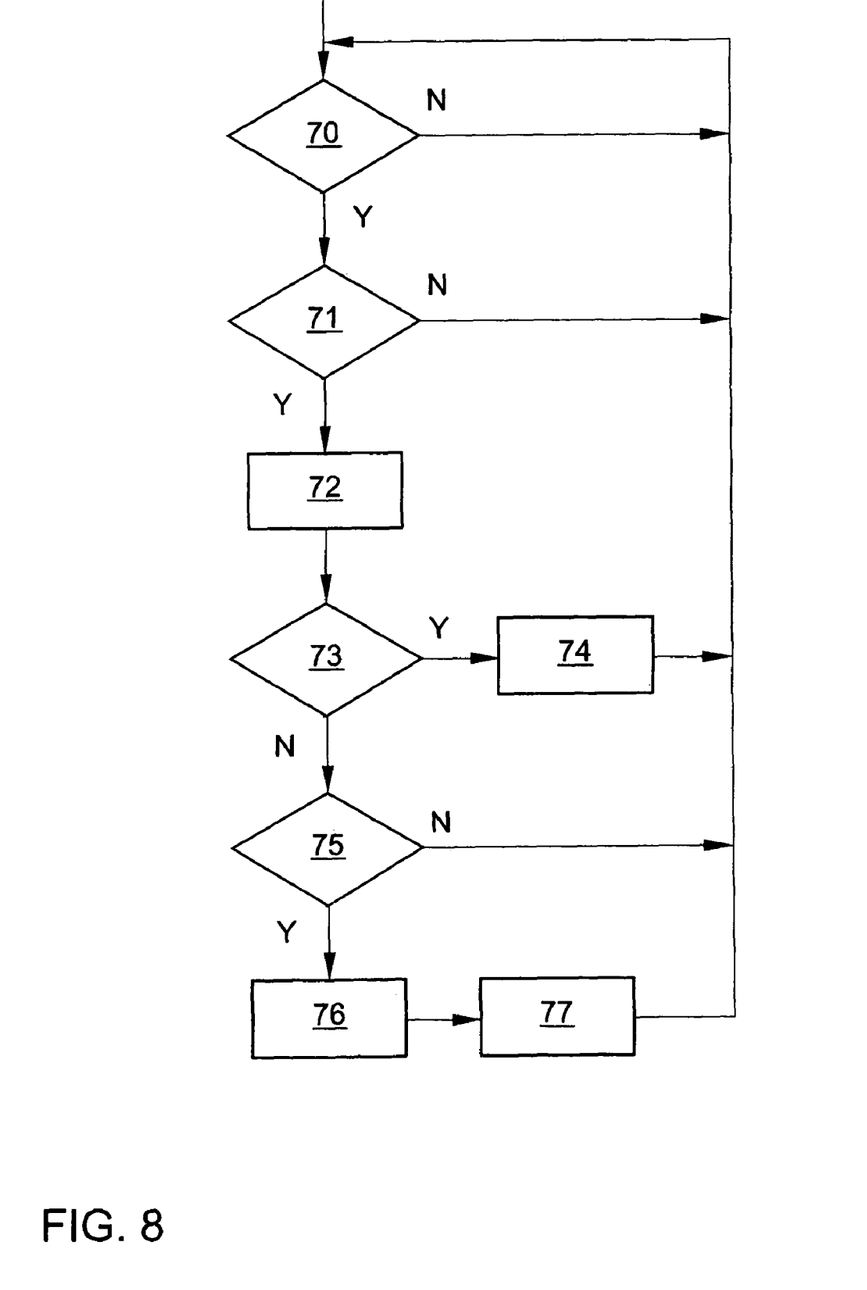
FIG. 8 illustrates a method for operating the input device illustrated in FIG. 2.

FIG. 8 illustrates a method implemented in control system 10, to operate input device 4 and to adjust a volume according to the procedure described with reference to FIG. 6 and FIG. 7. In this context, the variant in which slider 50 is moved according to the touching motion only if this touching motion extends through the region of slider 50 is implemented. However, it is provided that slider 50 is moved according to the touching motion only after having passing through the region of slider 50.

The method illustrated in FIG. 8 begins with a query 70 as to whether touch screen 11 or its operating surface 16 is touched in the region of slider 50. If touch screen 11 or its operating surface 16 is touched in the region of slider 50, query 70 is followed by a query 71 as to whether the position of this touching contact is modified along the y-coordinate within scale 51. If the position of this touching contact is modified along the y coordinate within scale 51, query 71 is followed by a step 72 in which slider 50 is shifted along the y coordinate according to the changed position of the touching contact, and the volume is adjusted according to the new position of slider 50. If queries 70 or 71 are answered in the negative, query 70 is implemented again.

Step 72 is followed by a query 73 as to whether slider 50 has attained its minimum position, its maximum position, or its mid-position. If slider 50 has attained its minimum position, its maximum position, or its mid-position, a deflection d of touch screen 11 takes place in step 74, illustrated in FIG. 9, which fades out, e.g., after approximately 70 ms. The time is denoted by t. If slider 50 has attained neither its minimum position nor its maximum position nor its mid-position, query 74 is followed by a query 75 as to whether $|y(i)-y_0| \geq \Delta y$ applies.

In this context, $y(i)$ is the instantaneous position of the touching contact in the y-direction, $y_0$ is the original position of slider 50 in the y-direction, and $\Delta y$ is a limit value. In the present exemplary embodiment, $\Delta y$ is equal to 3 mm. If $|y(i)-y_0| \geq \Delta y$ applies, a deflection d of touch screen 11 according to FIG. 9 takes place in a step 76, which corresponds to step 74, the deflection fading out, e.g., after approximately 70 ms. Step 76 is followed by a step 77 in which $y_0 = y(i)$ is set. Step 77 is followed by query 70.

Figure 10:
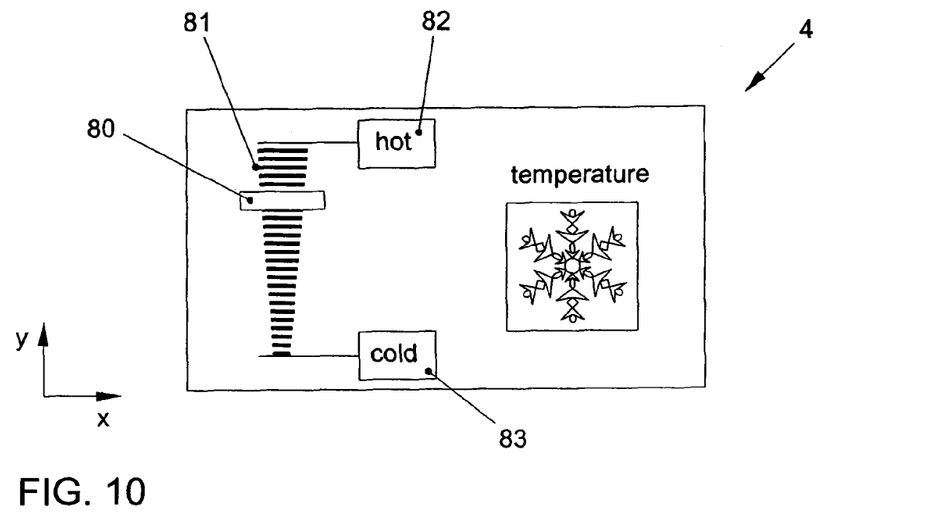
FIG. 10 illustrates the input device illustrated in FIG. 2 while displaying an operating mask for adjusting a temperature.
Figure 11:
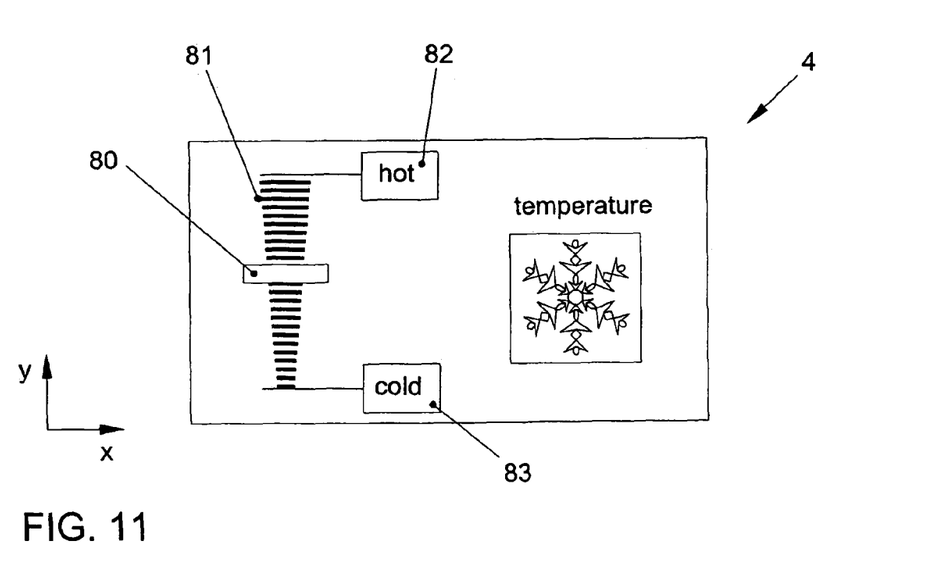
FIG. 11 illustrates the input device illustrated in FIG. 2 while displaying an operating mask for adjusting a temperature.

FIG. 10 and FIG. 11 illustrate input device 4 while an operating mask for adjusting a temperature is displayed. Reference numeral 80 denotes a slider represented with the aid of display 12, which is able to be moved along a scale 81 in order to display the setting of the temperature. Keys 82 and 83, displayed with the aid of display 12, are provided to set the temperature and the corresponding movement of slider 80. The temperature is increased by touching key 82, and the temperature is lowered by touching key 83.

As long as touch screen 11 or its operating surface 16 is touched in the region of keys 82 and 83, a deflection d of touch screen 11 takes place according to $$d = \begin{cases} 0 & \forall\, y \leq y_{cold} \\ 200\,\mu m \cdot \sin\!\left(2\cdot\pi\cdot\left(1+29\!\left(\dfrac{y-y_{cold}}{y_{hot}-y_{cold}}\right)\right)\text{Hz}\cdot t\right) & \forall\, y_{hot} > y > y_{cold} \\ 0 & \forall\, y \leq y_{hot} \end{cases}$$

or $$d = \begin{cases} 0 & \forall\, y \leq y_{cold} \\ 200\,\mu m \cdot \left(1+\left(\dfrac{y-y_{cold}}{y_{hot}-y_{cold}}\right)\right)\cdot \sin(2\cdot\pi\cdot 30\text{Hz}\cdot t) & \forall\, y_{hot} > y > y_{cold} \\ 0 & \forall\, y \geq y_{hot} \end{cases}$$

or $$d = \begin{cases} 0 & \forall\, y \leq y_{cold} \\ 200\,\mu m \cdot \left(1+\left(\dfrac{y-y_{cold}}{y_{hot}-y_{cold}}\right)\right)\cdot \sin\!\left(2\cdot\pi\cdot\left(1+29\!\left(\dfrac{y-y_{cold}}{y_{hot}-y_{cold}}\right)\right)\text{Hz}\cdot t\right) & \forall\, y_{hot} > y > y_{cold} \\ 0 & \forall\, y \geq y_{hot} \end{cases}$$

y being the instantaneous position of slider 80 in the y-direction, $y_{cold}$ being the position of the setting of the lowest temperature in the y-direction, and $y_{hot}$ being the setting of the highest temperature in the y-direction.

FIG. 10 and FIG. 11 illustrate input device 4 while an operating mask for operating a navigation system is shown. Reference numeral 90 denotes a map. It is provided that map 90 is able to be moved by a touching motion across touch screen 11 or its operating surface 16 in the region of map 90.

Figure 12:
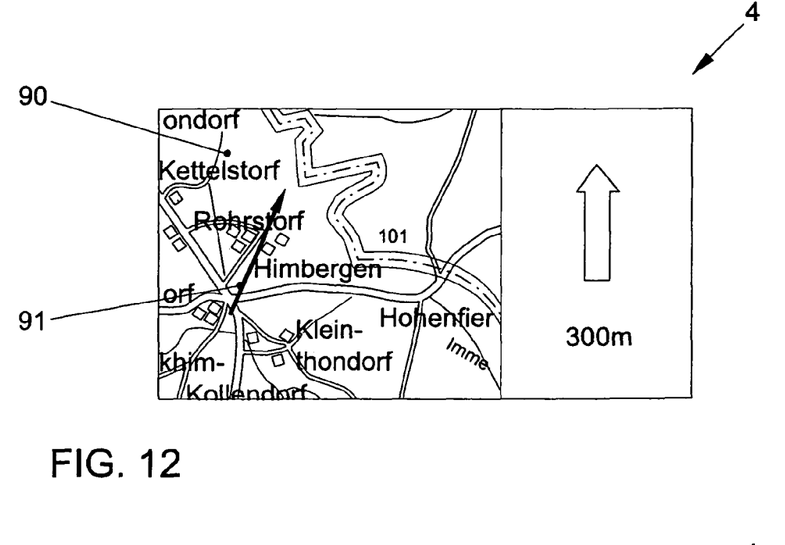
FIG. 12 illustrates the input device illustrated in FIG. 2 while displaying an operating mask for operating a navigation system.
Figure 13:
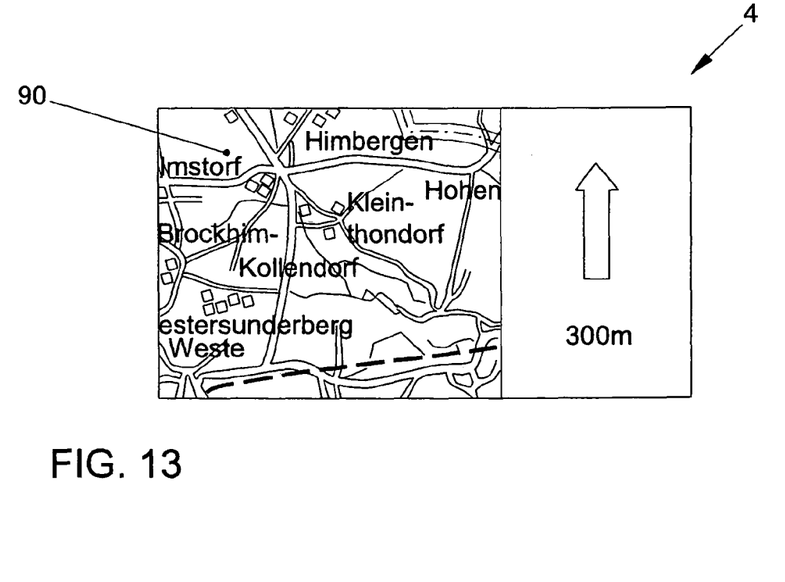
FIG. 13 illustrates the input device illustrated in FIG. 2 while displaying an operating mask for operating a navigation system.

For example, if a touching motion across touch screen 11 or its operating surface 16 takes place according to the arrow denoted by reference numeral 91 in FIG. 12, the visible cutaway portion of the map is displaced according to the illustration in FIG. 13.

Figure 14:
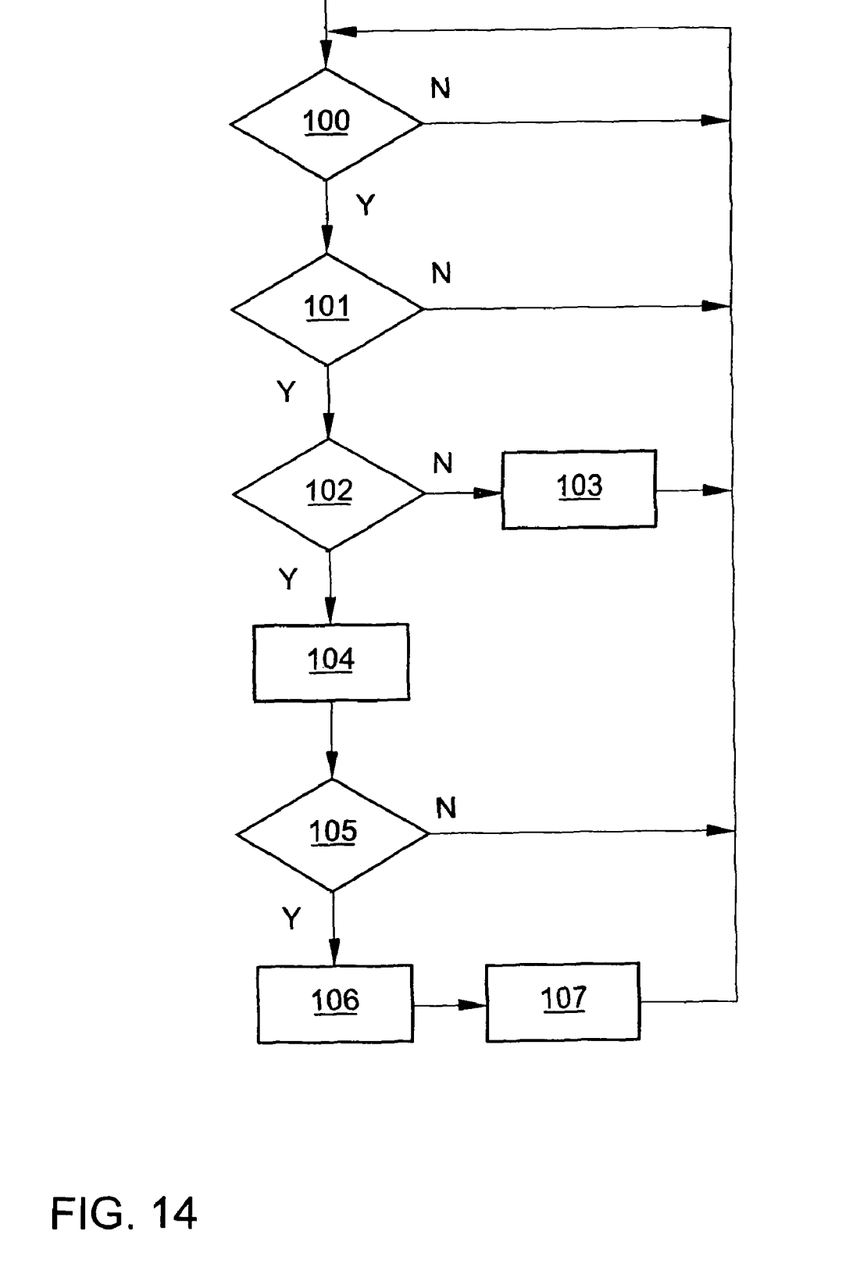
FIG. 14 illustrates a method for operating the input device illustrated in FIG. 2.

FIG. 14 illustrates a method, implemented in control system 10, for operating input device 4 and for displacing map 90 according to the procedure described with reference to FIG. 12 and FIG. 13. The method illustrated in FIG. 14 begins with a query 100 as to whether touch screen 11 or its operating surface 16 is being touched in the region of map 90. If touch screen 11 or its operating surface 16 is touched in the region of map 90, query 70 is followed by a query 101 as to whether the position of this touching contact is being modified. If the position of this touching contact is modified, query 101 is followed by a query 102 as to whether displacement of map 90 according to the touching movement across touch screen 11 or its operating surface 16 is allowed. If queries 100 or 101 are answered in the negative, query 100 is implemented again.

If displacement of map 90 according to the touching motion across touch screen 11 or its operating surface 16 is not allowed, a deflection d of touch screen 11 takes place in a step 103 according to $$d = 400\,\mu\text{m}\cdot\sin(2\cdot\pi\cdot 50\text{ Hz}\cdot t)$$

Step 103 is followed by query 100. However, if displacement of map 90 according to the touching motion across touch screen 11 or its operating surface 16 is allowed, query 102 is followed by a step 104 in which map 90 is moved according to the touching motion across touch screen 11 or its operating surface 16.

Step 104 is followed by a query 105 as to whether the following applies:

$$\sqrt{(x(i)-x_0)^2+(y(i)-y_0)^2} \geq \Delta D$$

Figure 9:
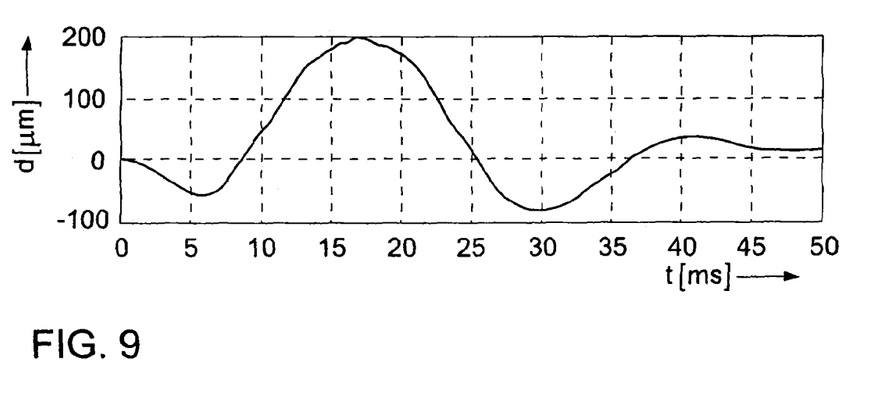
FIG. 9 illustrates a deflection of a touch screen.

$x(i)$ the instantaneous position of the touching contact in the x-direction; $x_o$ is the original position of map 90 in the x-direction; $y(i)$ is the instantaneous position of the touching contact in the y-direction; $y_0$ is the original position of map 90 in the y-direction; and $\Delta D$ is a limit value. $\Delta y$ may be equal to 3 mm. If $$\sqrt{(x(i)-x_0)^2+(y(i)-y_0)^2} \geq \Delta D$$

a deflection d of touch screen 11 illustrated in FIG. 9 takes place in a step 106, which corresponds to step 74, the deflection having faded out, e.g., after approximately 70 ms. Step 106 is followed by a step 107 in which $$x_0 = x(i)$$

and $y_0 = y(i)$ are set. Step 107 is followed by query 100.

The components and distances illustrated in FIGS. 2 to 5 are illustrated with simplicity and clarity in mind, and not necessarily to exact scale. For example, the orders of magnitude of some components and distances illustrated in FIGS. 2 to 5 are illustrated in an exaggerated manner compared to other components and distances illustrated in FIGS. 2 to 5 in order to facilitate understanding.

Example embodiments of the present invention may be used in conjunction with an input device such as that described, e.g., in European Published Patent Application No. 1 560 102, which is expressly incorporated herein in its entirety by reference thereto.

LIST OF REFERENCE NUMERALS

1 motor vehicle
2 steering wheel
3 instrument panel
4 input device
10 control system
11 touch screen
12 display
13 actuator
15 housing
16 operating surface
17 region
20, 21 opening
22, 23 affixation element
24, 25, 26, 27, 31 collar
30 plug contact
40, 41 rod
42, 43 sliding element
44, 45 affixation element
46, 47 sliding bearing
80 slider
81 scale
100, 101, 102, query
103, 104, 106, 107 step
82, 83 key
90 map
91 arrow
A display signal
d deflection
P position signal
S actuator control signal
t time
y x coordinate

What is claimed is:

1. An input device, comprising:
   a housing;
   a display adapted to visually represent an operating element;
   a touch screen disposed above the display and connected to the housing adapted to detect a touch contact of the touch screen in a region of the operating element;
   a control system adapted to displace the operating element represented by the display in accordance with a touch motion across the touch screen; and
   an actuator adapted to deflect the housing and the touch screen with respect to the display in a direction that is parallel to an operating surface of the touch screen when the operating element at least one of (a) attains a predefined position and (b) is moved a predefined distance.

2. The input device according to claim 1, wherein the input device is arranged as an input device for a motor vehicle.

3. The input device according to claim 1, wherein the touch screen is deflectable both when the operating element attains the predefined position and when the operating element is moved the predefined distance.

4. The input device according to claim 1, wherein an amplitude of deflection of the touch screen is adjustable as a function of at least one of (a) a position of the operating element and (b) a distance across which the operating element is moved.

5. The input device according to claim 1, wherein the touch screen is deflectable at a specific frequency that is adjustable as a function of at least one of (a) a position of the operating element and (b) a distance across which the operating element is moved.

6. The input device according to claim 1, wherein the predefined distance is between 1 mm and 5 mm.

7. The input device according to claim 1, wherein the actuator is adapted to deflect the touch screen in response to the operating element at least one of (a) attaining the predefined position and (b) moving the predefined distance.

8. The input device according to claim 1, wherein the housing is transparent at least in a region below the touch screen.

9. An input device, comprising:
   a housing;
   a display adapted to visually represent an operating element;
   a touch screen arranged above the display and connected to the housing adapted to detect a touch contact of the touch screen in a region of the operating element;
   a control system adapted to displace the operating element represented by the display in accordance with a touch motion across the touch screen; and
   an actuator adapted to periodically deflect the housing and the touch screen with respect to the display in a direction that is parallel to an operating surface of the touch screen at a specific frequency adjustable as a function of at least one of (a) a position of the operating element and (b) a distance across which the operating element is moved.

10. The input device according to claim 9, wherein the input device is arranged as an input device for a motor vehicle.

11. The input device according to claim 9, wherein the frequency is between 1 Hz and 30 Hz.

12. The input device according to claim 9, wherein the operating element includes at least one of (a) a slider and (b) a key.

13. The input device according to claim 9, wherein the operating element includes a map.

14. A method for operating an input device, comprising:
   visually representing an operating element on a display of the input device;
   detecting a touch contact of a touch screen in a region of the operating element, the touch screen arranged above the display and connected to a housing;
   moving the operating element represented by the display in accordance with a touch motion across the display; and
   deflecting the housing and the touch screen with respect to the display in a direction that is parallel to an operating surface of the touch screen when the operating element at least one of (a) attains a predefined position and (b) is moved a predefined distance.

15. The method according to claim 14, wherein the deflecting step includes deflecting the touch screen both when the operating element attains the predefined position and when the operating element is moved the predefined distance.

16. The method according to claim 14, wherein the deflecting step includes deflecting the touch screen by an oscillating motion.

17. The method according to claim 14, wherein the touch screen is deflected in response to the operating element at least one of (a) attaining the predefined position and (b) moving the predefined distance.

18. A method for operating an input device, comprising:
visually representing an operating element on a display of the input device;
detecting a touch contact on a touch screen in a region of the operating element, the touch screen arranged above the display and connected to a housing;
moving the operating element in accordance with a touch motion across the touch screen;
deflecting the housing and the touch screen with respect to the display in a direction that is parallel to an operating surface of the touch screen at a specific frequency when moving the operating element; and
adjusting the frequency in accordance with at least one of (a) a position of the operating element and (b) a distance across which the operating element is moved.

19. The method according to claim 18, wherein the frequency is between 1 Hz and 30 Hz.

* * * * *